US009725983B2

(12) United States Patent
Kahoe et al.

(10) Patent No.: US 9,725,983 B2
(45) Date of Patent: *Aug. 8, 2017

(54) ELECTROMAGNETIC OIL PIPE PLUGGER

(76) Inventors: Joseph Kahoe, Fountain Valley, CA (US); Brandon Iglesias, New Orleans, LA (US)

(*) Notice: Subject to any disclaimer, the term of this patent is extended or adjusted under 35 U.S.C. 154(b) by 125 days.

This patent is subject to a terminal disclaimer.

(21) Appl. No.: 13/152,937

(22) Filed: Jun. 3, 2011

(65) Prior Publication Data

US 2011/0297265 A1 Dec. 8, 2011

Related U.S. Application Data

(60) Provisional application No. 61/351,132, filed on Jun. 3, 2010, provisional application No. 61/351,612, filed on Jun. 4, 2010, provisional application No. 61/353,092, filed on Jun. 9, 2010, provisional application No. 61/354,838, filed on Jun. 15, 2010.

(51) Int. Cl.
| | |
|---|---|
| *E21B 33/064* | (2006.01) |
| *E21B 33/13* | (2006.01) |
| *E21B 33/129* | (2006.01) |
| *E21B 33/134* | (2006.01) |
| *F16L 55/128* | (2006.01) |

(52) U.S. Cl.
CPC ............ *E21B 33/13* (2013.01); *E21B 33/064* (2013.01); *E21B 33/129* (2013.01); *E21B 33/134* (2013.01); *F16L 55/1283* (2013.01)

(58) Field of Classification Search
USPC .............................. 166/310, 244.1, 179, 317
See application file for complete search history.

(56) References Cited

U.S. PATENT DOCUMENTS

| | | | |
|---|---|---|---|
| 6,279,656 B1 | 8/2001 | Sinclair et al. | |
| 7,062,960 B2 * | 6/2006 | Couren et al. | 73/152.51 |
| 7,428,922 B2 * | 9/2008 | Fripp et al. | 166/66.5 |
| 2001/0032723 A1 * | 10/2001 | Chatterji | C09K 8/508 |
| | | | 166/295 |
| 2003/0000693 A1 | 1/2003 | Couren et al. | |
| 2003/0166470 A1 | 9/2003 | Fripp et al. | |

OTHER PUBLICATIONS

Notification of Transmittal of the International Search Report and the Written Opinion of the International Searching Authority, or the Declaration issued by the International Searching Authority in the corresponding international application.

* cited by examiner

*Primary Examiner* — Jennifer H Gay
*Assistant Examiner* — Caroline Butcher
(74) *Attorney, Agent, or Firm* — Flyer & Flyer, a Professional Law Corporation; David R. Flyer

(57) ABSTRACT

A device and method can be initiated to stop an extreme oil leak at the point of origin in a well pipe, after a common Blowout Preventer ("BOP") fails. An electromagnetic chemical adhesive pipe plugging system comprises an elongated hollow injection quill, with a plurality of circumferentially spaced magnetic jaws, shoes and heads, which are capable of being pushed radially outward into gripping engagement with an inner diameter of a pipe assisted by chemical adhesive bonds and a magnetic field, to plug the leak.

3 Claims, 1 Drawing Sheet

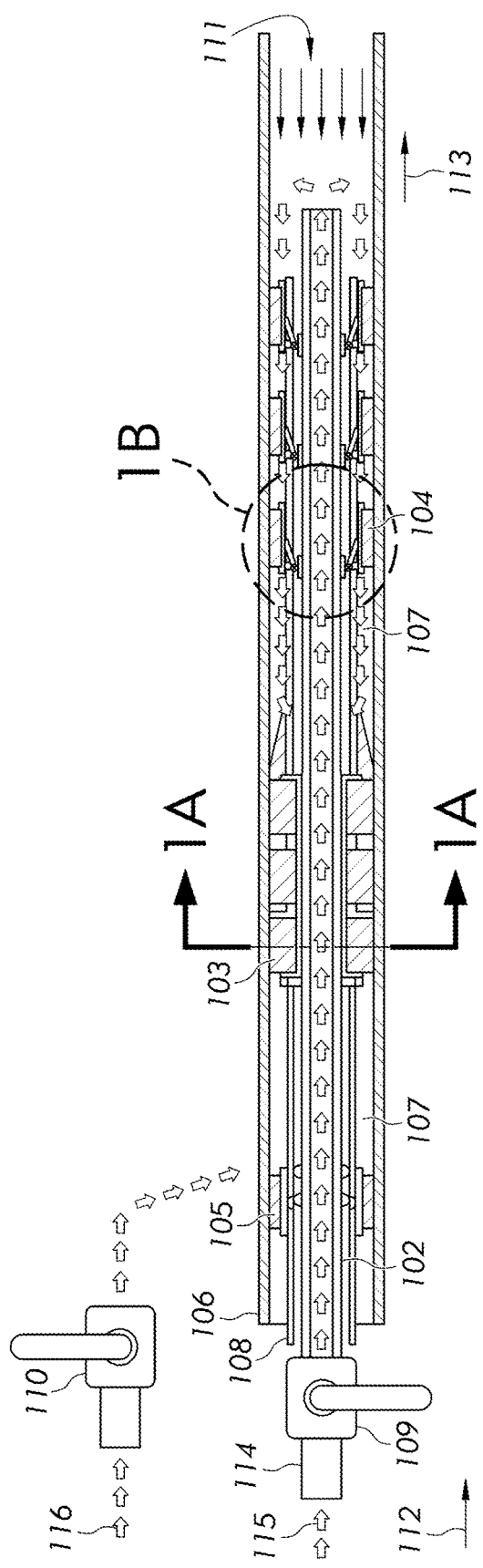
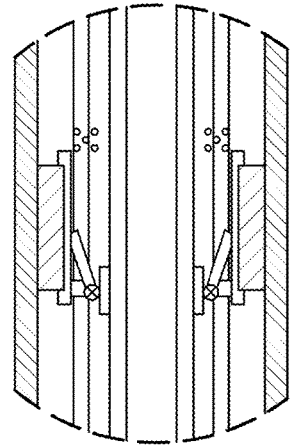
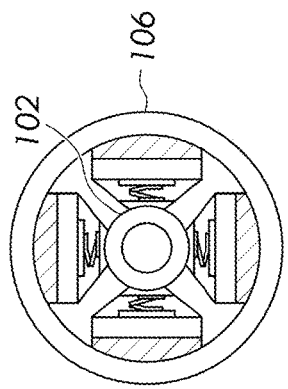
FIG. 1
FIG. 1A
FIG. 1B

ELECTROMAGNETIC OIL PIPE PLUGGER

CROSS REFERENCE TO RELATED APPLICATIONS

The present application claims the benefit of prior U.S. Provisional Application Ser. No. 61/351,132, filed Jun. 3, 2010; Ser. No. 61/351,612, filed Jun. 4, 2010; Ser. No. 61/353,092, filed Jun. 9, 2010; and Ser. No. 61/354,838, filed Jun. 15, 2010.

FIELD OF THE INVENTION

The present invention relates generally to methods and apparatus for plugging oil well pipes, pipelines, and gaps in metal bodies, and in a particular though non-limiting embodiment, to a method and apparatus for plugging pipelines utilizing in-situ electromagnetic chemical adhesive packed bed technology on a rapidly deployable basis.

BACKGROUND OF THE INVENTION

An oil well blowout is the uncontrolled release of oil and/or natural gas on land or below water that occurs when pressure control equipment fails. Prior to the invention of oil well pressure control equipment in the 1920's, blowouts were part of the oil drilling process and commonly referred to as oil gushers. Pressure control equipment is best explained by lumping equipment into two (2) major categories: (1) drilling techniques and (2) blowout preventers.

Drilling techniques are the first line of defense and involve varying the density of the drilling fluid to overcome the downhole pressure of newly drilled zones. If a high pressure zone is drilled into, the drilling liquid reservoir (mud pits) increase in level. On the other hand, if a low pressure vacuous zone is drilled into, the mud pits decrease in level. A rapid increase or decrease in mud pit levels may lead to a blowout if the mud engineer is not able to increase the density and/or volume of the mud to counteract a rapid loss of mud or a rapid increase in downhole pressure.

Blowout preventers ("BOP") were introduced in the 1920's and are installed at the wellhead in the event that drilling techniques fail and a high pressure release occurs.

When an oil well fails to contain reserves underground with conventional defensive technology such as mud and BOP devices, there currently is not an effective technology to kill the runaway oil well.

Current well-kill technology is largely defensive rather than offensive in nature. When the defensive measure fails, no rapid response offensive measure exists. The only proven offensive response is a bottom kill, which requires drilling a new well-hole subsequently followed by shut-in of the runaway well permanently.

Furthermore, conventional defensive technology, such as mud and BOP devices, are not retrievable.

The time lag associated with an oil well blowing out, flowing into the ocean, and final capping catalyzed by the drilling of relief wells costs oil companies, government, and local industry hundreds of millions of dollars. The costs include lost opportunity and increased insurance premiums and environmental damage to name a few. For example a 15,000 barrels per day ("bpd") oil well leak in the Gulf of Mexico when crude oil is trading at WTI $70.00/bbl results in a daily economic loss of $1,000,000 not counting environmental impact, mobilized manpower, and associated lawsuits.

An extreme oil leak case in the Gulf of Mexico that occurred in the 1970's, known as the Ixtoc I Pemex Oil Spill, resulted in 3,000,000 barrels of crude oil released into the Gulf. The Ixtoc incident lasted for 294 days at an average release rate of 10,204 bpd. The economic loss solely attributed to depleted reserves from the Ixtoc I Oil Spill today would represent a whopping $210,000,000 excluding mobilized manpower, environmental impact, and associated lawsuits.

There is, therefore, an important and as yet unmet need for an oil pipe plugger that overcomes the problems currently existing in the art, and which allows an oil well to be repaired in a safe, reliable, timely, cost-effective, and environmentally-friendly manner, and which allows the well to be used again.

SUMMARY OF THE INVENTION

An electromagnetic pipe plugging system is provided, including an elongated hollow injection quill, said quill having a plurality of circumferentially spaced magnetic jaws, a plurality of circumferentially spaced shoes, and a plurality of circumferentially spaced magnetic heads, wherein the magnetic jaws, shoes, and magnetic heads are capable of being pushed radially outward into gripping engagement with the inner diameter or outer diameter within an annular space of a pipe against the pressure forces acting thereon, and the magnetic heads combined with injected chemical adhesive between the magnetics, pipe wall, and packed bed of metal fragments and adhesive are capable of creating a plug inside of the pipe to stop or significantly reduce the flow leaving the pipe.

BRIEF DESCRIPTION OF THE DRAWINGS

The embodiments disclosed herein will be better understood, and numerous objects, features, and advantages made apparent to those skilled in the art by referencing the accompanying drawings.

FIG. 1 is a side view of an electromagnetic oil pipe plugger system, according to one example embodiment of the invention.

FIG. 1A is a cross-sectional view of one section of the plugger system. Fig. 1B is an enlarged view of one section of the plugger system.

DETAILED DESCRIPTION OF SEVERAL EXAMPLE EMBODIMENTS

The Electro Magnetic Oil Pipe Plugger ("EMOPP") as disclosed herein is able to plug leaking oil pipes above ground, in the ground, or underwater immediately upon detection. EMOPP minimizes economic losses associated with oil leakage into bodies of water, mitigation of environmental impacts on aquatic life, coastlines, regional zones, and destruction of industries that depend on an environmentally sound aquatic ecosystem (i.e. fishing and tourism).

In an example embodiment, EMOPP shortens the oil well shut-in time period from months to hours. Minimizing the time an oil well leak occurs by using EMOPP is a win-win for the oil companies, governments, and environmental activists. EMOPP does not exclude traditional oil field service well-kill operations, but enhances their effectiveness by adding a new tool to the toolbox, thus providing a rapidly deployable oil leak solution in combination with traditional tried and proven oil field service technology.

The description that follows includes a number of exemplary system designs and methods of use that embody advantages of the presently inventive subject matter. However, it will be understood by those of ordinary skill in the art that the disclosed embodiments will admit to practice without some of the specific details recited herein. In other instances, well-known oil plugging equipment, protocols, structures and techniques have not been described or shown in detail in order to avoid obfuscation of the invention.

FIG. 1 depicts a first example embodiment of an electromagnetic oil pipe plugger system 101. In its simplest form, the system comprises an elongated hollow injection quill 102, a magnetic particle collector comprising a plurality of circumferentially spaced magnetic heads 103, a plurality of circumferentially spaced magnetic jaws 104, and a stabilizer comprising a plurality of circumferentially spaced shoes 105. The magnetic particle collector 103, magnetic jaws 104, and stabilizer 105 are attached to a power source 108.

The injection quill 102 fits inside of a wellhead pipe 106 in need of plugging, having an upstream end 112 and a downstream end 113, creating an annular space 107 between the injection quill 102 and the wellhead pipe 106 or may fit within an existing annular space or through any available injection line 114.

While FIG. 1 appears to depict only two shoes 105, six magnetic heads 103, and six magnetic jaws 104, commercial embodiments comprising multiple combinations of shoes, magnetic heads, and magnetic jaws are presently contemplated and described below. Nonetheless, those of skill in the pertinent arts will readily appreciate that description of a limited system with singular elements is illustrative, and will not limit the scope of the subject matter disclosed herein.

In the first step of the disclosed method according to a preferred embodiment, the user activates the magnetic jaws 104 and stabilizer 105, causing the magnetic jaws 104 and the stabilizer shoes 105 to be pushed radially outward into gripping engagement with the inner diameter of the wellhead pipe 106, against the pressure forces acting thereon. FIG. 1B is an expanded, cross-sectional view of the magnetic jaws 104.

In another example embodiment, an adhesive is applied or injected through to the surface of the magnetic jaws 104 once the injection quill has been inserted 102 into the wellhead pipe 106, so as to further secure the plugger system 101 inside of the wellhead pipe 106 against shear force.

In the next step according to an example embodiment, the user activates the magnetic particle collector 103, causing the magnetic heads 103 to be pushed radially outward into gripping engagement with the inner diameter of the wellhead pipe 106, creating an intense magnetic field in the annular space 107.

FIG. 1A is a cross-sectional view of the injection quill 102 with attached magnetic heads 103, circumferentially spaced around the injection quill 102 and in gripping engagement with the inner diameter of the wellhead pipe 106 upon activation of the magnetic particle collector 103. FIG. 1B is an enlarged view of two circumferentially spaced magnetic jaws 104.

According to the next step in an example embodiment, a slurry carrier comprising metallic particles and adhesive which is also known as an electromagnetic chemical adhesive mixture 115, is injected into the injection quill 102 via an insertion valve 109, at a rate sufficient to overcome the flow of fluid 111 in the wellhead pipe 106. The slurry carrier exits the bottom end of the injection quill 102 and accumulates in the annular space 107 and is trapped by the magnetic field and binded by the adhesive.

Next, a cement mixture or other substance 116 is injected into the injection quill 102 via a second insertion valve 110, at a rate sufficient to overcome the flow of fluid 111 in the wellhead pipe 106. The mixture accumulates in the annular space 107, further plugging the wellhead pipe 106.

In a preferred embodiment, the substance injected during this step is a magnetorheological fluid ("MR fluid"). In general, an MR fluid comprises a carrier fluid and microscopic magnetic particles. When subjected to a magnetic field, the MR fluid's apparent viscosity greatly increases, becoming a viscoelastic solid.

Upon completion of the above steps, an in-situ electromagnetic packed polymer/MR fluid bed serves to plug the pipe 106 and prevent the fluid 111 from exiting the pipe 106 or well.

While the invention has been depicted and described in detail above with respect to several exemplary embodiments, those of ordinary skill in the art will also appreciate that minor changes to the description, and various other modifications, omissions and additions may also be made without departing from either the spirit or scope thereof.

The invention claimed is:

1. A method of plugging an oil pipe, comprising:
locating an oil pipe which needs plugging, said pipe having an upstream end and a downstream end, wherein fluid is flowing in the pipe from the upstream end to the downstream end;
then in a first step, inserting an electromagnetic oil pipe plugger (EMOPP) into the pipe, creating an annular space between the EMOPP and pipe;
wherein the EMOPP is inserted into the downstream end of the pipe in an axial direction relative to the pipe through any available injection lines;
wherein the EMOPP is an elongated hollow injection quill, said injection quill having an open upper end and an open lower end, and comprised of a magnetic particle collector and a stabilizer, connected to a power source;
wherein the magnetic particle collector is comprised of a plurality of circumferentially spaced magnetic heads and a plurality of circumferentially spaced magnetic jaws located on the outer diameter of the EMOPP;
wherein the stabilizer is comprised of a plurality of circumferentially spaced shoes located on the outer diameter of the EMOPP and spaced from the magnetic jaws; and
wherein an external mechanical band fastener is attached to the outer diameter of the open upper end of the EMOPP, to additionally secure the EMOPP to the oil pipe;
in a second step, the magnetic jaws and the stabilizer are activated, causing the magnetic jaws and the stabilizer shoes to be pushed outward into a gripping engagement with the inner diameter of the oil pipe against pressure forces acting thereon;
in a third step, the magnetic heads are activated causing the magnetic heads to be pushed radially outward into a gripping engagement with the inner diameter of the oil pipe against pressure forces acting thereon, thereby creating an intense magnetic field in the annular space;
in a fourth step which involves a first injection, a slurry carrier comprised of medium to small ferrous particles, steel wool and rubber pads to act as a shock absorber, and packed with an electromagnetic chemical adhesive mixture, is inserted into the EMOPP via an insertion valve;

where the electromagnetic chemical adhesive mixture is a two-part epoxy;

wherein the slurry carrier is injected through the EMOPP into the oil pipe, exits the upstream end of the EMOPP thereby accumulating in the annular space, and is trapped by the magnetic field and then is bound by the electromagnetic chemical adhesive mixture;

in a fifth step which involves a second injection, injecting a cement mixture through the EMOPP at a rate sufficient to overcome the flow of the fluid in the oil pipe; and then in a sixth step, removing the EMOPP from the oil pipe.

2. The method of claim 1, wherein said medium to small ferrous particles, steel wool, rubber pads and adhesive particles are injected to form a plug.

3. The method of claim 1, wherein the electromagnetic chemical adhesive mixture is a magnetorhelogical fluid.

* * * * *